US010270812B2

(12) United States Patent
Vashi et al.

(10) Patent No.: US 10,270,812 B2
(45) Date of Patent: Apr. 23, 2019

(54) REGISTRATION MANAGEMENT FOR A SECONDARY WIRELESS DEVICE USING A PRIMARY WIRELESS DEVICE

(71) Applicant: Apple Inc., Cupertino, CA (US)

(72) Inventors: Prashant H. Vashi, Sunnyvale, CA (US); Najeeb M. Abdulrahiman, Fremont, CA (US); Rohan C. Malthankar, San Jose, CA (US); Arun G. Mathias, Sunnyvale, CA (US); Vikram Bhaskara Yerrabommanahalli, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/609,999

(22) Filed: May 31, 2017

(65) Prior Publication Data
US 2017/0346858 A1 Nov. 30, 2017

Related U.S. Application Data

(60) Provisional application No. 62/343,597, filed on May 31, 2016.

(51) Int. Cl.
*H04W 76/19* (2018.01)
*H04L 29/06* (2006.01)
(Continued)

(52) U.S. Cl.
CPC ...... *H04L 65/1016* (2013.01); *H04L 65/1073* (2013.01); *H04W 76/19* (2018.02);
(Continued)

(58) Field of Classification Search
None
See application file for complete search history.

(56) References Cited

U.S. PATENT DOCUMENTS

| 9,924,432 B2 * | 3/2018 | Fwu | H04W 28/24 |
| 2007/0030824 A1 * | 2/2007 | Ribaudo | G01S 5/0018 370/328 |

(Continued)

FOREIGN PATENT DOCUMENTS

WO WO-2016076577 A1 * 5/2016 ............ H04W 60/06

*Primary Examiner* — Ajit Patel
(74) *Attorney, Agent, or Firm* — Dickinson Wright RLLP

(57) ABSTRACT

Methods and apparatus to manage registration for cellular services of a secondary wireless device associated with a primary wireless device are disclosed. The secondary wireless device can detect entering proximity to the primary wireless device and in response to the detecting deactivate a cellular wireless interface of the secondary wireless device to conserve battery power, and provide an indication to the primary wireless device, via a non-cellular wireless interface, to cause the primary wireless device to perform a deregistration of the secondary wireless device for cellular services. The secondary wireless device can establish connections and communicate via non-cellular wireless interfaces while within proximity of the primary wireless device. Upon leaving proximity of the primary wireless device, the secondary wireless device can activate the cellular wireless interface and register for cellular services to permit establishing connections and communicating directly with a cellular wireless network via the cellular wireless interface.

20 Claims, 10 Drawing Sheets

(51) Int. Cl.
*H04W 88/04* (2009.01)
*H04W 8/00* (2009.01)

(52) U.S. Cl.
CPC ............ *H04W 8/005* (2013.01); *H04W 88/04* (2013.01); *Y02D 70/1262* (2018.01); *Y02D 70/1264* (2018.01); *Y02D 70/14* (2018.01); *Y02D 70/142* (2018.01); *Y02D 70/144* (2018.01); *Y02D 70/166* (2018.01); *Y02D 70/168* (2018.01); *Y02D 70/20* (2018.01); *Y02D 70/22* (2018.01); *Y02D 70/23* (2018.01); *Y02D 70/26* (2018.01)

(56) References Cited

U.S. PATENT DOCUMENTS

| | | | | |
|---|---|---|---|---|
| 2011/0177802 | A1* | 7/2011 | Gupta | H04L 12/66 455/418 |
| 2014/0004865 | A1* | 1/2014 | Bhargava | H04W 74/0816 455/445 |
| 2014/0274216 | A1* | 9/2014 | Olodort | H04M 1/006 455/566 |
| 2016/0381727 | A1* | 12/2016 | Dwarakanath | H04W 4/21 455/41.2 |
| 2017/0180911 | A1* | 6/2017 | Burton | H04W 4/70 |

* cited by examiner

REGISTRATION MANAGEMENT FOR A SECONDARY WIRELESS DEVICE USING A PRIMARY WIRELESS DEVICE

CROSS-REFERENCE TO RELATED APPLICATIONS

This application claims the benefit of U.S. Provisional Patent Application No. 62/343,597, entitled "REGISTRATION MANAGEMENT FOR A SECONDARY WIRELESS DEVICE USING A PRIMARY WIRELESS DEVICE" filed May 31, 2016, the content of which is incorporated herein by reference in its entirety for all purposes.

FIELD

The described embodiments relate generally to wireless communications using electronic devices, including systems and techniques for managing registration of a secondary wireless device for cellular services using an associated primary wireless device.

BACKGROUND

Technological advances have led to situations where a user can have multiple different wireless devices available for communication, often at the same general location and at the same time. In addition to a designated primary wireless device, such as a smart phone, a user may also have an additional secondary wireless device, such as a wearable computing device that is also capable of conducting wireless communications using one or more different radio access technologies (RATs). The wireless devices can be associated with a common account, and the user can originate outgoing communication sessions or receive incoming communication sessions using one or more of the wireless devices alone or in tandem. For a direct connection, a communication session can be anchored directly from a wireless device through a wireless network to a remote device, while for a relayed connection, the communication session can be anchored at the primary wireless device, which provides the connection to the wireless network, and relayed through a local wireless connection to the secondary wireless device through which the user can communicate. For secondary wireless devices that offer limited battery power, managing which connections are used for cellular communications for the secondary wireless device can assist with extending battery life.

In view of the foregoing, there is a need for wireless devices that are capable of intelligently and efficiently managing communication sessions using different available connections to ensure the best possible user experience.

SUMMARY

Representative embodiments set forth herein disclose various systems and techniques for managing registration of wireless devices to enable or disable communication session capabilities to allow for originating or terminating direct connections at a secondary wireless device or to prefer relayed connections to the secondary wireless device via a primary wireless device. In particular, the embodiments set forth various systems and techniques for a wireless connection manager executing on a primary wireless device (or in conjunction with a wireless connection manager executing on a secondary wireless device) to manage registration of the secondary wireless device for cellular services based on proximity of the primary and secondary wireless devices to each other. The wireless connection manager(s) can be triggered to carry out wireless connection management operations in an automated manner (e.g., according to default, programmed, and/or user settings) or in a reactive manner (e.g., in response to receiving a user input). According to some embodiments, a wireless connection manager can operate by (1) detecting a change in proximity between a primary wireless device and a secondary wireless device, (2) in response to detecting the change in proximity, determining whether the primary wireless device is in proximity to the secondary wireless device, (3) when the primary wireless device is in proximity to the secondary wireless device, deactivating a cellular wireless interface of the secondary wireless device and deregistering the secondary wireless device for cellular services, and (4) when the primary wireless device is not in proximity to the secondary wireless device, activating the cellular wireless interface of the secondary wireless device and registering the secondary wireless device for cellular services.

In some embodiments, the secondary wireless device sends a message to the primary wireless device when entering proximity to the primary wireless device to cause the primary wireless device to deregister the secondary wireless device. In some embodiments, the message includes an address of record associated with registration of the secondary wireless device for cellular services. In some embodiments, the primary wireless device communicates with an Internet Protocol Multimedia Service (IMS) server to deregister the secondary wireless device for cellular services using the address of record. In some embodiments, the primary wireless device checks with the IMS server to determine a registration status of the secondary wireless device for cellular services and performs a deregistration procedure in response to confirmation that the secondary wireless device is registered for cellular services. In some embodiments, the primary wireless device deregisters the secondary wireless device for cellular services on behalf of the secondary wireless device when in proximity to the secondary wireless device, while the secondary wireless device registers for cellular services on its own when not in proximity to the primary wireless device.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
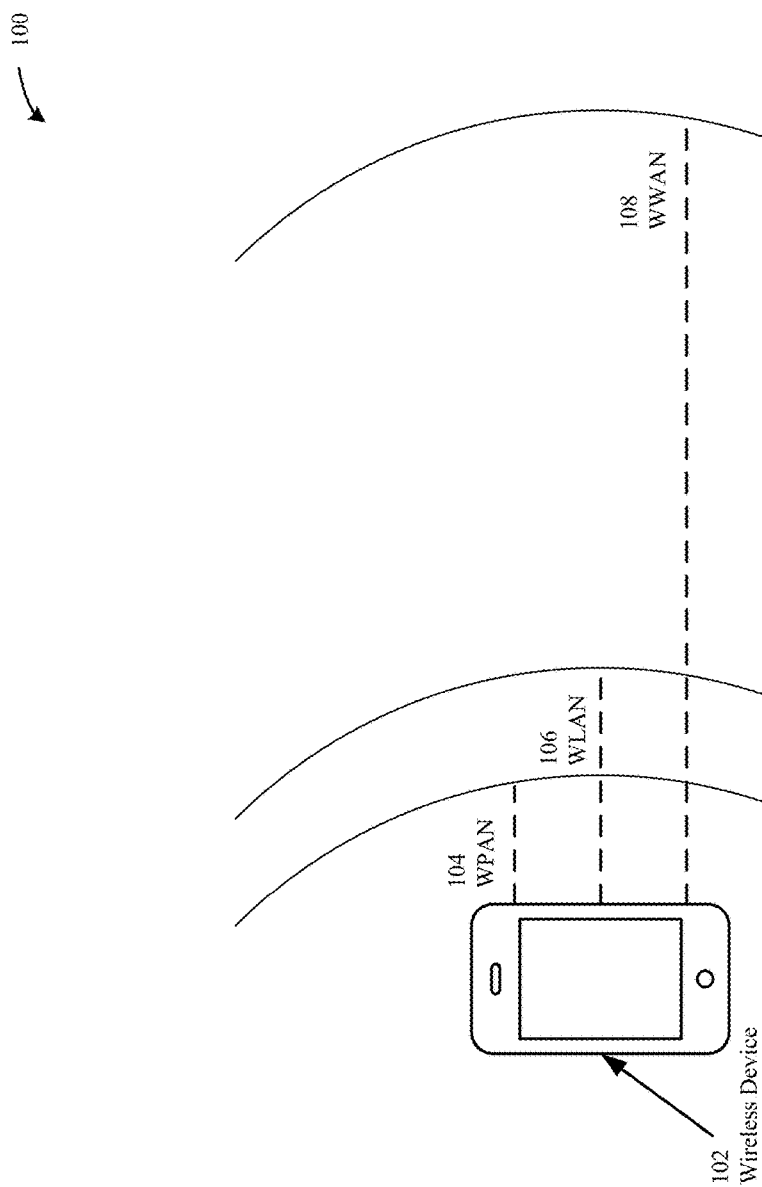
FIG. 1 illustrates in block diagram format a set of overlapping networks for an exemplary wireless device according to various embodiments of the present disclosure.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Wireless devices often provide for a multiplicity of different wireless connections, e.g., wireless wide area network (WWAN) connections via cellular wireless networks (when the wireless device is so equipped), wireless local area network (WLAN) connections, and wireless personal area network (WPAN) connections. Using a relayed connection, a secondary wireless device without (or configured to disable) wireless cellular communication can originate or receive connections through a primary wireless device that provides a wireless cellular connection to another device, e.g., a "remote" device across a network. More generally, the relayed connection can include a local connection between the primary and secondary wireless devices, while the primary wireless device provides a remote connection to the remote device, via a circuit-switched legacy wireless connection or via a packet-switched wireless connection, such as provided by voice over Long Term Evolution (VoLTE), by Wi-Fi calling, by Facetime® (video and/or audio), or similar connections. Alternatively, non-cellular wireless connections, such as Wi-Fi calling or Facetime, as well as cellular wireless connections, when cellular wireless circuitry is enabled, can terminate directly on the secondary wireless device. A user can choose to enable or disable cellular wireless connection capabilities for a secondary wireless device, e.g., via a user interface on the secondary wireless device or through a user interface of an associated primary wireless device. For a secondary wireless device with limited battery power, using a lower power, shorter distance, non-cellular wireless capability, e.g., via a wireless personal area network (WPAN) or a wireless local area network (WLAN), can be preferred over using a higher power, longer distance, cellular wireless capability when connections via the WPAN or WLAN are available. In some embodiments, a local connection between the secondary wireless device and the associated primary wireless device can be (i) a WPAN connection, such as a Bluetooth (classic or Low Energy) connection, (ii) an Apple Wireless Direct Link (AWDL) connection, (iii) a direct WLAN connection between the primary and secondary wireless devices, such as through a Wi-Fi direct connection or another ad hoc WLAN connection that does not require the use of a central access point, or (iv) an indirect WLAN connection between the primary and secondary wireless devices via a central access point. The secondary wireless device can be associated with the primary wireless device, which can relay cellular connections that terminate at the primary wireless device to the secondary wireless communication device using a local connection.

Rather than requiring user intervention, it can be preferable for a wireless connection manager in the primary wireless device and/or in the secondary wireless device to dynamically enable or disable wireless cellular connection capabilities for the secondary wireless device. When a local connection between the secondary wireless device and an associated primary wireless device that can provide a cellular connection (or more generally a WWAN connection) is available, e.g., based on detection of proximity of the secondary wireless device to the primary wireless device, a wireless connection manager in the secondary wireless device can disable cellular wireless circuitry of the secondary wireless device, e.g., a baseband processor and/or associated cellular wireless transceiver components, to conserve battery power. When not in proximity to an associated primary wireless device, or when the associated primary wireless device is unable to provide a cellular (or WWAN) connection, the secondary wireless device can register for direct connection of cellular services, e.g. by registering with network-based server, such as with an Internet Protocol Multimedia Service (IMS) server of a wireless network. When registered, the secondary wireless device can start mobile originated connections or receive mobile terminated connections directly on the secondary wireless device using cellular wireless circuitry of the secondary wireless device. When in proximity to an associated primary wireless device, the secondary wireless device can deregister from direction connection of cellular services at the secondary wireless device and instead receive or originate cellular wireless connections relayed through a local connection between the secondary wireless device and the primary wireless device, the latter which can provide a cellular connection to a cellular wireless network. The secondary wireless device can provide information to the primary wireless device, e.g., via a local WPAN connection or WLAN connection, that can cause the primary wireless device to perform a deregistration procedure for the secondary wireless device. In some embodiments, the secondary wireless device provides an address of record for the secondary wireless device to the primary wireless device to use to perform the deregistration procedure. In some embodiments, the primary wireless device checks for a registration status of the secondary wireless device, e.g., by querying a server of a wireless network, and performs the deregistration procedure only when the secondary wireless device is registered for cellular services.

The primary wireless device and/or the secondary wireless device can detect proximity of each other using a discovery procedure, e.g., as part of establishing or initializing a local WPAN connection or WLAN connection. In some embodiments, the primary wireless device and/or secondary wireless device can monitor a local WPAN connection or a local WLAN connection to determine whether proximity between the primary wireless device and the secondary wireless device changes. In some embodiments, the primary wireless device and/or the secondary wireless device monitors a signal strength and/or a signal quality to determine whether a local connection between the primary wireless device and the secondary wireless device is degrading and a proximity status is likely to change. When proximity between the secondary wireless device and the primary wireless device changes, or is likely to change, the secondary wireless device can proactively enable cellular wireless circuitry and perform a registration procedure with a wireless network to provide for direct cellular connections to the secondary wireless device. In some embodiments, the primary wireless device performs a registration procedure on behalf of the secondary wireless device. In some embodiments, the secondary wireless device performs a registration procedure in conjunction with the primary wireless device. In some embodiments, the secondary wireless device performs a registration procedure to register for cellular services after termination of a local connection between the secondary wireless device and the primary wireless device.

The primary wireless device can obtain a set of associated wireless devices, including secondary wireless devices, from a network-based server, such as an IMS server or a cloud based server that maintains information on associations for a user account and/or for the primary wireless device. The primary wireless device can register with the network-based server for cellular services and provide its own address of record when registering. The network-based server can return a set of associated Uniform Resource Identifiers (URIs) to the primary wireless device in response to the registration, e.g., in a 200 OK response sent to the primary wireless device. The primary wireless device can identify a set of associated wireless devices, including secondary wireless devices, by excluding identifiers for the primary wireless device, e.g., its own International Mobile Subscriber Identity (IMSI) value and/or its own Mobile Directory Number (MDN) value for the set of associated URIs returned by the network-based server to the primary wireless device. In response to receipt of a notification message sent from a secondary wireless device upon entering proximity to the primary wireless device, the primary wireless device can check whether the secondary wireless device is registered for cellular services as a secondary wireless device associated with the primary wireless device. The primary wireless device can send a registration request message to a network-based server to determine registration status of the secondary wireless device. The registration request message can include in a To field a registered address of record for the secondary wireless device and can not include a Contact header. In some embodiments, the primary wireless device obtains the registered address of record for the secondary wireless device from the network-based server, e.g., returned in a message from the network-based server upon registration of the primary wireless device as described hereinabove. In some embodiments, the primary wireless device obtains the registered address of record from another network-based server, e.g., from a cloud-service based server that maintains information for a set of associated wireless devices. The primary wireless device can examine contents of a response from the network-based server to the registration request message, such as a value in the Contact header in a 200 OK response message sent to the primary wireless device, to determine whether the secondary wireless device is registered for cellular services. When the Contact header in the 200 OK message includes and associated URI of the secondary wireless device, the primary wireless device can determine that the secondary wireless device is registered for cellular services. When the secondary wireless device is registered for cellular services, after the secondary wireless device enters proximity to the primary wireless device, the primary wireless device can perform a deregistration procedure on behalf of the secondary wireless device to deregister the secondary wireless device for cellular services. The primary wireless device, in some embodiments, can send a message, e.g., a Register Request message with (i) a From field set to a registered address of record of the primary wireless device, (ii) a To field set to a registered address of record of the secondary wireless device, and (iii) a Contact header set to a pre-determined value, e.g., a "*" (asterisk) value, to indicate that all bindings associated with the address of record for the secondary wireless device (indicated in the To field) can be removed by the network-based server. In some embodiments, the secondary wireless device provides its address of record in a message via a non-cellular wireless interface to the primary wireless device upon entering proximity to the primary wireless device. In some embodiments, the message provided by the secondary wireless device is sent as part of discovery procedure, such as used for a WPAN or WLAN association. In some embodiments, the secondary wireless device provides an explicit notification message to the primary wireless device to de-register the secondary wireless device for cellular services. In some embodiments, the explicit notification message includes a registered identifier of the secondary wireless device for the primary wireless device to use to deregister the secondary wireless device for cellular services.

In some embodiments, a secondary wireless device can operate in a lower power consumption mode, e.g., to use local non-cellular wireless interfaces for communication with other devices preferably over cellular wireless interfaces when communication via the non-cellular wireless interfaces permit connections to remote devices. In some embodiments, the secondary wireless device uses and/activates lower power, e.g., non-cellular, wireless interfaces and deactivates higher power, e.g., cellular, wireless interfaces based on availability of communication paths using non-cellular wireless interfaces, e.g., via a WPAN connection to a primary wireless device, via a direct WLAN connection to a primary wireless device, via a direct peer-to-peer connection to another wireless device, via an indirect WLAN connection to a primary wireless device via an intermediary wireless device, such as an access point, or via a direct WLAN connection to an access point that connects to a wide area network. In some embodiments, the secondary wireless device leverages IMS registration for services, such as for Voice over IP (VoIP), Voice over LTE (VoLTE), or Wi-Fi calling and when able to communicate with remote devices using non-cellular interfaces preferably uses these lower power wireless interfaces. In some embodiments, the secondary wireless device communicates via a primary wireless device to remote devices, e.g., via a relayed connection. In some embodiments, the secondary wireless device communicates with a remote device via a direct connection from the secondary wireless device. In some embodiments, the secondary wireless device communicates with remote devices using a cellular wireless interface when unable to use non-cellular wireless interfaces for communication with remote devices. In some embodiments, use of the cellular wireless interface is based at least in part on a battery level satisfying a battery threshold. In some embodiments, the secondary wireless device manages registration for cellular services in conjunction with a primary wireless device and a network-based server. In some embodiments, the secondary wireless device communicates using mechanisms specified in one or more Requests For Comment (RFC) protocols, including but not limited to RFC 3261 and/or RFC 3455. In some embodiments, the secondary wireless device and/or the primary wireless device communicate with an IMS server (or other network-based server) using messages in accordance with one or more RFC protocols. In some embodiments, such as when a wireless service provider does not offer access to an IMS server used for registration of the secondary wireless device for cellular services, the primary wireless device and/or the secondary wireless device communicate using SMS messages to cause registration and/or deregistration for cellular services of the secondary wireless device. In some embodiments, the primary wireless device sends one or more SMS messages to a pre-determined address or number associated with a network-based server to cause deregistration of the secondary wireless device for cellular services. In some embodiments, specific text is included in the body of one or more SMS messages sent to a specific network-based server and/or gateway server to determine a registration status for the secondary wireless device for cellular services, to register for cellular services for the secondary wireless device, and/or to deregister for cellular services for the secondary wireless device.

In some embodiments, a primary wireless device and/or a secondary wireless device can measure radio conditions for signals received via a non-cellular wireless interface and can determine whether proximity between the primary wireless device has changed, e.g., when entering proximity and/or when leaving proximity. In some embodiments, the secondary wireless device can cause the primary wireless device to register the secondary wireless device before proximity between them is lost. In some embodiments, the secondary wireless device activates a cellular interface and performs a registration procedure for cellular services for the secondary wireless device in advance of loss of proximity, e.g., based on measurements of signal strength and/or time of arrival for signals between the primary wireless device and the secondary wireless device in anticipation of a loss of proximity. In some embodiments, the secondary wireless device and/or the primary wireless device adapt values for signal parameters based on a history of non-cellular wireless connections between the secondary wireless device and the primary wireless device to determine whether a proximity change is likely to occur and/or has occurred.

Accordingly, the foregoing approaches provide systems and techniques for intelligently and efficiently managing connections for wireless devices. A more detailed discussion of these systems and techniques is set forth below and described in conjunction with FIGS. 1 through 9, which illustrate detailed diagrams of systems and methods that can be used to implement these systems and techniques.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for a secondary wireless device, e.g., without and/or not configured for WWAN communication, can be extended using a local WPAN (or WLAN) connection to a primary wireless device that provides a WWAN connection. Alternatively, the secondary wireless device can also include wireless circuitry for a WLAN connection and can originate and/or terminate connections via a WLAN connection. Whether to use a direct connection or a relayed connection can depend on performance characteristics of one or more links of an active communication session between the secondary wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a primary wireless device can be preferred. By monitoring performance of an active communication session and availability and capabilities of associated wireless devices (such as proximity to a primary wireless device), a secondary wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode user equipment (UE) can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

FIG. 1 illustrates a set of overlapping wireless networks for a wireless device illustrated in block diagram format. The wireless device 102 can include a combination of hardware and software to provide wireless connections using one or more different wireless networks alone, separately, or in combination, such as via the set of overlapping networks 100. The wireless device 102 can represent a device having wireless communications capabilities, such as a smart phone (e.g., an iPhone®), a tablet device (e.g., an iPad®), a wearable device (e.g., an Apple Watch™), a portable media player (e.g., an iPod®), a laptop computer (e.g., a MacBook®), or a desktop computer (e.g., an iMac®), among other possible devices. Additional wireless devices, which can connect to the wireless device 102 and provide audio, video, and/or data media interfaces can include a wireless headset, a vehicle sound system, a digital television, a digital media recorder, a wearable computing device or any other suitable wireless device capable of wireless communication and input/output capabilities.

The wireless device 102 can include a combination of hardware, software, and/or firmware to provide communication using a WPAN 104, which can provide power efficient connections while operating over a limited distance. WPAN connections can typically provide for connecting the wireless device 102 to peripheral and associated wireless devices, such as headsets, earpieces, supplemental display devices, and supplemental input/output devices, for example. WPAN connections can also be used to relay communication between the wireless device 102 and the peripheral wireless device through which the user can interact for a communication session. A representative WPAN 104 can operate in accordance with a communication protocol specified by the Bluetooth SIG, for example, and/or by Apple such as an Apple Wireless Direct Link (AWDL). The wireless device 102 can also include a combination of hardware, software, and/or firmware to provide communication using a WLAN 106 that can provide a higher data rate and a greater operating range than a WPAN 104. The wireless device 102 can include separate and/or shared hardware, software, and/or firmware elements for the WPAN 104 and the WLAN 106. Both the WPAN 104 and WLAN 106 can operate as "local" wireless networks. The wireless device 102 can also include additional hardware, software, and/or firmware to provide a WWAN 108 capability, such as to interconnect with one or more cellular wireless networks. The wireless device 102 can provide a multitude of services using one or more connections through its wireless networking capabilities. As described further herein, a primary wireless device can include WWAN 108 capability, while a secondary wireless device can also include WWAN 108 capability in addition to providing WLAN 106 and/or WPAN 104 communication capabilities. The secondary wireless device can communicate directly with a remote device via a WWAN 108 connection, or indirectly with a remote device via a WLAN 106 connection or a WPAN 104 connection. The secondary wireless device can preferably disable cellular wireless circuitry and use an indirect, relayed connection via a WLAN 106 or a WPAN 104 to an associated primary wireless device, which can provide a further cellular WWAN 108 connection to a remote device, when the associated primary wireless device is within proximity of the secondary wireless device. When an associated primary wireless device is not within proximity of the secondary wireless device, and/or when a WLAN 106 connection and/or WPAN 104 connection to another wireless device through which the secondary wireless device can communicate with remote devices is not available, the secondary wireless device can enable cellular wireless circuitry to provide for direct termination of a WWAN 108 connection at the secondary wireless device. As described further herein, the secondary wireless device and an associated primary wireless device can detect a change in proximity between each other (e.g., entering proximity to the primary wireless device by the secondary wireless device and/or leaving proximity of the primary wireless device by the secondary wireless device), and a registration for cellular services maintained by one or more servers of a wireless network for the secondary wireless device can be updated accordingly. When entering proximity of the associated primary wireless device, the secondary wireless device can disable (e.g., power down a portion or all of) cellular wireless circuitry and send a message using non-cellular wireless circuitry to the primary wireless device to perform a deregistration procedure for the secondary wireless device. When leaving proximity of the associated primary wireless device, the secondary wireless device can enable (e.g., power up a portion or all of) cellular wireless circuitry and perform a registration procedure for cellular services with one or more servers of a wireless network for the secondary wireless device.

Figure 2:
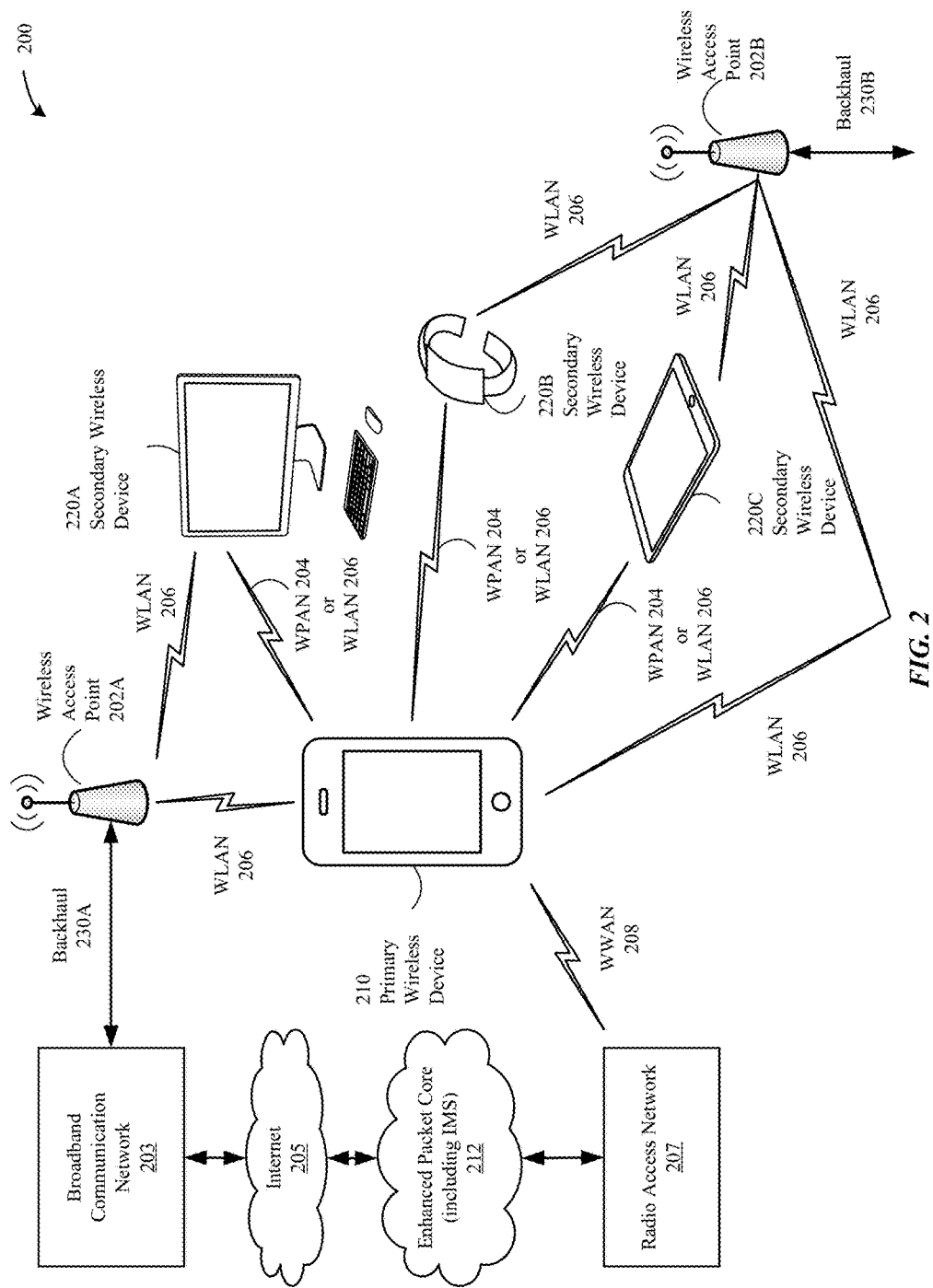
FIG. 2 illustrates in block diagram format an exemplary system of different wireless networks and wireless devices according to various embodiments of the present disclosure.

FIG. 2 illustrates, in block diagram format, an exemplary system 200 including different wireless networks and wireless devices according to various embodiments of the present disclosure. System 200 includes a primary wireless device 210 that can be interconnected through several different wireless communication technologies to an external set of networks and to a set of one or more secondary wireless devices 220A, 220B, and 220C. The primary wireless device 210 can be a "central" device for WPAN purposes and/or can form direct WLAN connections, such as Wi-Fi direct links and/or Apple Wireless Direct Link (AWDL) connections, to one or more of the secondary wireless devices 220A/B/C. The primary wireless device 210 can receive information from one or more packet-switched wireless networks and/or from one or more circuit-switched wireless networks. For example, the primary wireless device 210 can connect via a WWAN connection 208 through a radio access network 207 and an enhanced packet core network 212, which can include an Internet Protocol (IP) Multimedia Subsystem (IMS) to manage packet connections such as for Voice over LTE (VoLTE). The primary wireless device 210 can use the WWAN connection 208 to access a broad variety of services (e.g., voice calls, text messages, data access, video calls, multimedia messaging, and media streaming). Similarly, the primary wireless device 210 can use a WLAN connection 206 provided through a wireless access point 202A interconnected to a broadband communication network 203 via a backhaul connection 230A to access a similar wide range of services (or through wireless access point 202B interconnected via a backhaul connection 230B to the same (or another) broadband communication network 203. The broad set of services provided through the WWAN connection 208 and/or through the WLAN connection 206 can be extended to one or more secondary wireless devices 220 A/B/C through additional WLAN connections 206 or WPAN connections 204, such that a WWAN connection 208 to the primary wireless device 210 can be relayed, e.g., audio, video, text, and/or other media packets can be communicated between the primary wireless device 210 and one or more secondary wireless devices 220A/B/C that provide input/output capabilities for a user when the secondary wireless devices 220 A/B/C are within proximity of the primary wireless device 210.

Each of the secondary wireless devices 220A, 220B, 220C illustrated in FIG. 2 can provide output display capabilities as well as input response capabilities to allow a user of the primary wireless device 210 to interact with various services or otherwise relay connections or communications, such as through one or both of a WLAN connection 206 or WPAN connection 204. For example, any of secondary wireless devices 220A, 220B, 220C can provide call relay functionality for an incoming audio/video/interactive messaging connection or other applicable connection in conjunction with the primary wireless device 210, such that the user can accept an incoming connection or originate an outgoing connection at any of the secondary wireless devices 220A, 220B, or 220C. Such call relay functionality can be facilitated by way of WLAN connections to a host server (e.g., using an iCloud® service) via a common wireless access point 202A and/or 202B, or by the various WPAN connections 204 or direct WLAN connections 206, for example. In addition, one, some or all of the secondary wireless devices 220A, 220B, 220C can be stand-alone independent wireless devices that are able to operate independently of the primary wireless device 210. In one specific non-limiting embodiment, the secondary wireless device 220A can be a desktop computing device, the secondary wireless device 220B can be a wearable computing device, such as an electronic watch, and the secondary wireless device 220C can be a tablet device. It will be readily appreciated that other types and arrangements of wireless devices can be used, and that fewer or more than three such devices can be secondary wireless devices associated with the primary wireless device 210. One or more of the secondary wireless devices 220 A/B/C can also include cellular wireless circuitry (or more generally WWAN 208 wireless circuitry) that can allow for communication via direct WWAN connections 208, such as via the radio access network 207. The WWAN 108 connection capability of the one or more of the secondary wireless devices 220 A/B/C can be disabled when in proximity to the primary wireless device 210 to conserve battery power when alternative connections, e.g., WPAN connections 204 and/or WLAN connections 206 can be used instead. The WWAN connection 208 capability of the one or more of the secondary wireless device 220 A/B/C can be enabled when not in proximity to the primary wireless device 210 to provide direct WWAN connections 208 to the one or more of the secondary wireless devices 220 A/B/C. In some embodiments, enabling and disabling WWAN 108 (or cellular) wireless circuitry can depend on a stored battery power level for the secondary wireless device 220 A/B/C. In some embodiments, when a stored battery level satisfies a battery threshold level, the wireless circuitry for WWAN connections 208 can be enabled (or allowed to be enabled) when not in proximity to the primary wireless device 210. In some embodiments, when the stored battery level does not satisfy the battery threshold level, the wireless circuitry for WWAN 108 connections can be disabled irrespective of proximity to the primary wireless device 210.

Figure 3:
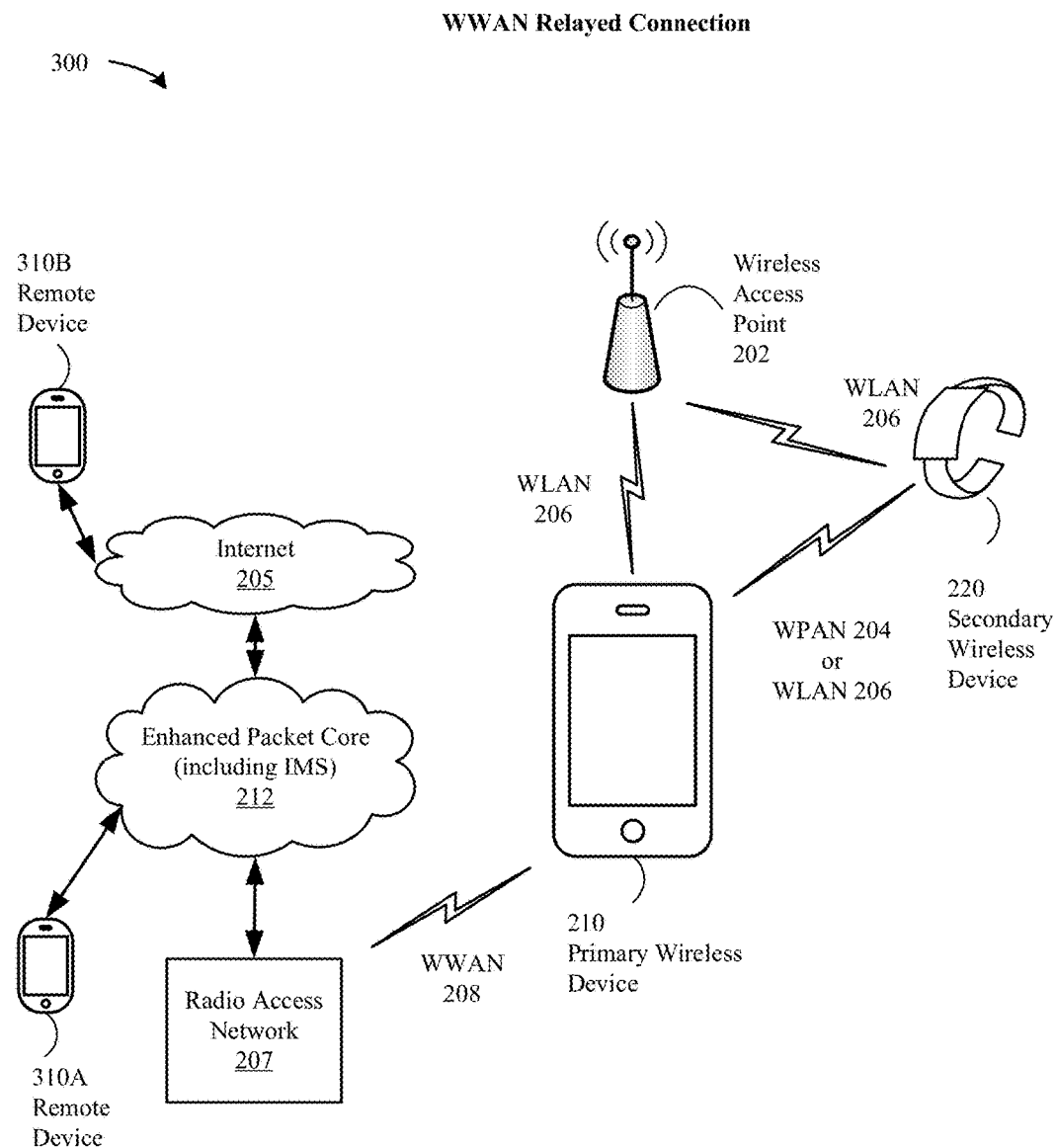
FIG. 3 illustrates in block diagram format a wireless wide area network relayed connection between a secondary wireless device and a remote device through a primary wireless device via a non-cellular wireless network and a cellular wireless network according to various embodiments of the present disclosure.

FIG. 3 illustrates a block diagram 300 of a relayed WWAN connection 208 between a secondary wireless device 220 and a remote device 310A or 310B through a primary wireless device 210 via a local non-cellular wireless network, e.g., via a WLAN connection 206 through wireless AP 202, via a WPAN connection 204, or via a direct WLAN connection 206 between the primary wireless device 210 and the secondary wireless device 220. The relayed connection also includes a wireless wide area network (WWAN) connection 208 between the primary wireless device 210 and a cellular wireless network that includes a radio access network 207 and an enhanced packet core network 212 connected to the Internet 205. The primary wireless device 210 can serve as an anchor for a connection to the remote device 310A or 310B and relay audio, video, data, messaging, media, or other applicable communication packets to the secondary wireless device 220 through which the user can receive and/or generate input/output. The relayed connection can use either the WLAN connection 206 (via wireless AP 202 or direct) or the WPAN connection 204 to extend the connection between the primary wireless device 210 and the remote device 310A or 310B. The WPAN connection 204 can provide limited range, while the WLAN connections 206, either through the wireless access point (AP) 202 or direct, can provide a wider range (as well as higher throughput) for local connection between the primary wireless device 210 and the secondary wireless device 220. Communication to and from remote device 310A or 310B can traverse one or more of the enhanced packet core network 212, which can include an IMS network element, or the Internet 205. Both circuit-switched connections at a remote device 310A or 310B and packet-switched connections at a remote device 310A or 310B can be used for the communication session. In some embodiments, packets for the communication session are managed by an IMS network element and/or by a network-based server knowledgeable of associations of the primary wireless device 210 with the secondary wireless device 220, e.g., an iCloud server. Relayed connections via the primary wireless device 210 can be preferred to direct connections to the secondary wireless device 220 when relayed connections are available, as the shorter distance for local communication between the secondary wireless device 220 and the primary wireless device 210 can consume less battery power than longer distance direct cellular connections.

Figure 4:
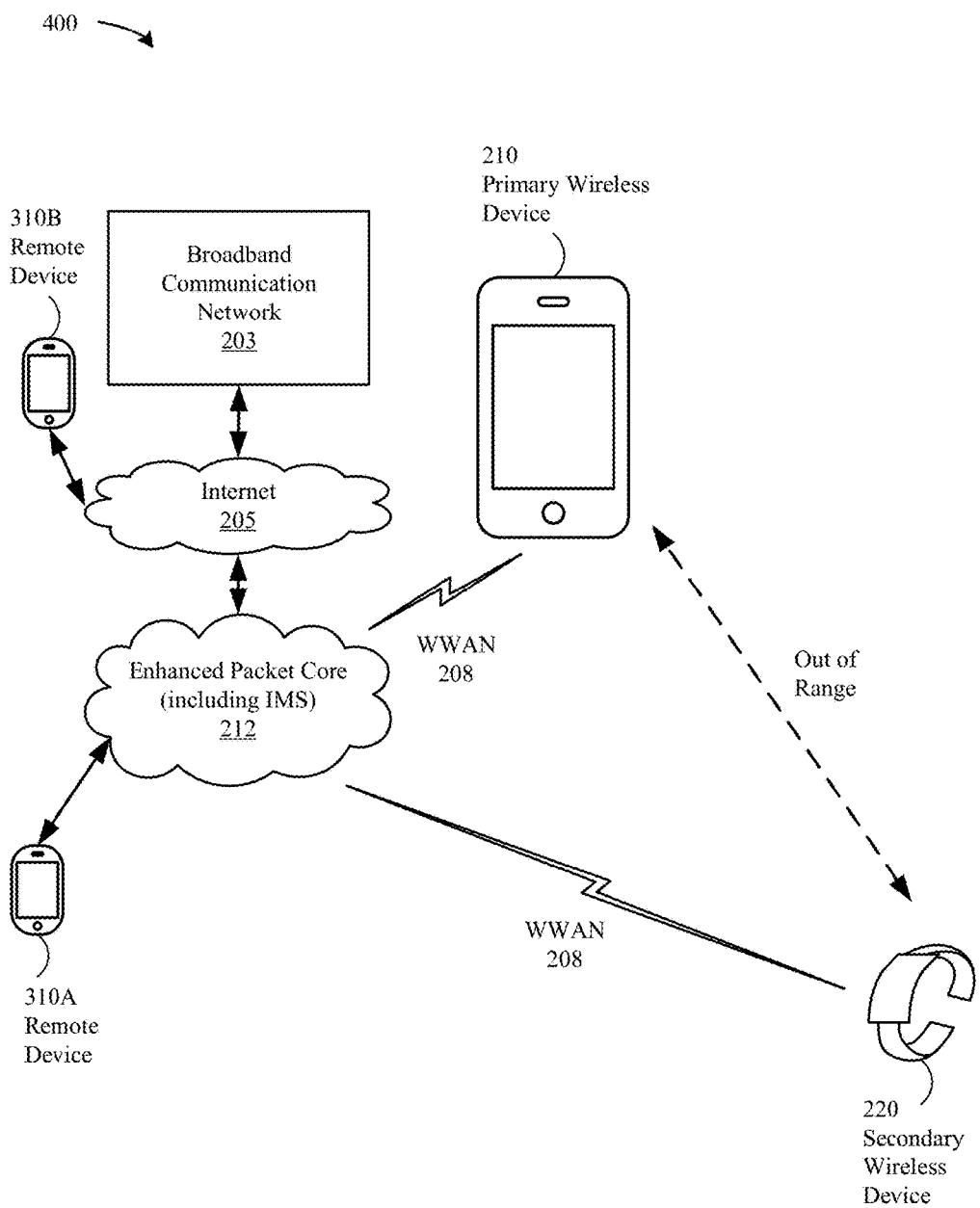
FIG. 4 illustrates in block diagram format a wireless wide area network direct connection between a secondary wireless device and a remote device via a cellular wireless network according to various embodiments of the present disclosure.

FIG. 4 illustrates a block diagram 400 of a direct WWAN connection 208 between a secondary wireless device 220 and a remote device 310A or 310B, where the direct WWAN connection 208 can be used when the secondary wireless device 220 is out of range of the primary wireless device 210. The direct WWAN connection 208 for the secondary wireless device 220 can provide for packet-switched voice services, such as Voice over Internet Protocol (VoIP) or Voice over Long Term Evolution (VoLTE) and for packet-switched data services to the remote device 310A or 310B. As the secondary wireless device 220 (and the user thereof) can be mobile, e.g., the user of the secondary wireless device 220 can move change position with respect to the primary wireless device 210, which can provide for relayed connections using shorter distance local connections between the secondary wireless device 220 and the primary wireless device 210 for communication with remote devices, e.g., remote device 310 A or 310B, where the primary wireless device 210 provides a WWAN connection 208 as illustrated in FIG. 3. When within proximity (within range) of the primary wireless device 210, the secondary wireless device 220 can use local connections, e.g., WPAN connections 204 and/or WLAN connections 206, to the primary wireless device 210, which can provide WWAN connections 208 to a remote device 310 A or 310B. WWAN 208 (or cellular) wireless circuitry of the secondary wireless device 220 can be disabled when entering within range of (within proximity of) the primary wireless device 210. When not within proximity (out of range) of the primary wireless device 210, the secondary wireless device 220 can enable WWAN 208 (or cellular) wireless circuitry and communicate with a remote device 310 A or 310 B via a WWAN connection 208.

Representative Exemplary Methods

Figure 5:
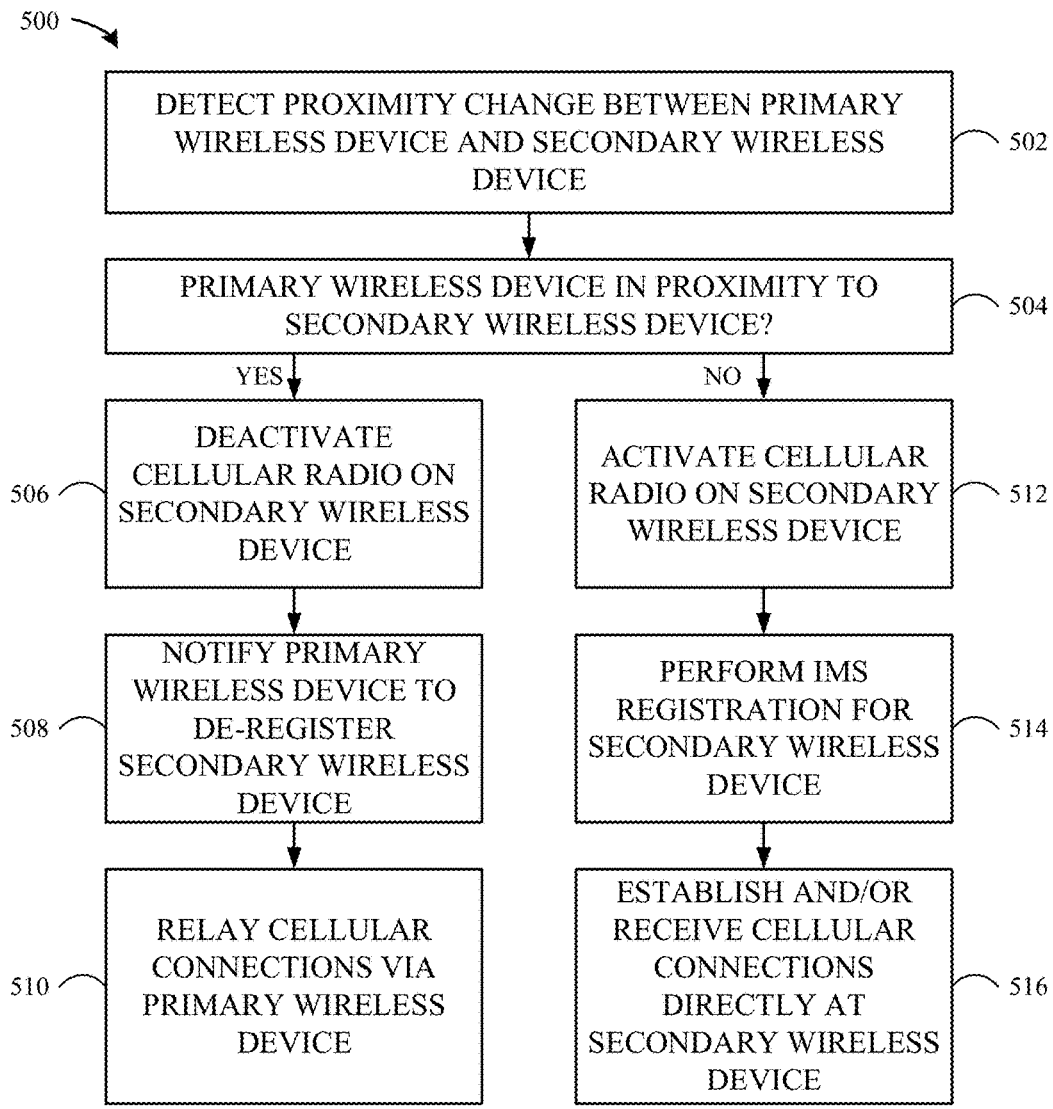
FIG. 5 illustrates a flowchart of an exemplary method performed by a wireless connection manager for managing registration and deregistration of a secondary wireless device for cellular services according to various embodiments of the present disclosure.

FIG. 5 illustrates a flowchart 500 of an exemplary method performed by a wireless connection manager for managing registration and deregistration of a secondary wireless device 220 for cellular services. In block 502, the secondary wireless device 220. At 502, the secondary wireless device 220 detects a change in proximity between the secondary wireless device 220 and a primary wireless device 210. At 504, the secondary wireless device 220 determines whether the secondary wireless device 220 is in proximity to the primary wireless device 210. Proximity between the primary wireless device 210 and the secondary wireless device 220 can be detected based on one or more of: (i) performing a discovery procedure in accordance with a WPAN protocol, (ii) establishing communication via a non-cellular wireless interface, or (iii) measuring a signal strength for a signal received from the primary wireless device 210 that satisfies a signal strength threshold.

When the secondary wireless device 220 is in proximity to the primary wireless device 210, e.g., when entering proximity of the primary wireless device 210, the secondary wireless device 220, at 506, deactivates a cellular wireless interface (which can also be referred to as a cellular radio) of the secondary wireless device 220. Deactivation can include powering down all or a portion of wireless circuitry including but not limited to a baseband processor, baseband components, transmitters, receivers, transceivers, amplifiers, receive signal chains or the like. In some embodiments, the secondary wireless device 220 determines whether an active connection is using the cellular wireless interface before deactivating the cellular wireless interface. In some embodiments, the secondary wireless device 220 waits until the cellular wireless interface is not active before deactivating the cellular wireless interface. At 508, the secondary wireless device 220 notifies the primary wireless device 210 to cause the primary wireless device 210 to perform a deregistration procedure of the secondary wireless device 220 for cellular services. In some embodiments, the secondary wireless device 220 notifies the primary wireless device 210 via a non-cellular wireless interface of the secondary wireless device 220. In some embodiments, the non-cellular wireless interface of the secondary wireless device 220 includes a WPAN interface and/or a WLAN interface. In some embodiments, the secondary wireless device 220 is associated with the primary wireless device 210 for cellular services. At 510, when the secondary wireless device 220 is in proximity to the primary wireless device 210, incoming cellular connections can terminate at the primary wireless device 210, which can relay audio, video, and/or data for the a cellular connection to the secondary wireless device 220. In some embodiments, the primary wireless device 210 deregisters the secondary wireless device 220 with an IMS server for cellular services. In some embodiments, the notification provided by the secondary wireless device 220 at 508 includes a registered address of record for the secondary wireless device 220 that the primary wireless device 210 can use as part of the deregistration procedure.

When the secondary wireless device 220 is not in proximity to the primary wireless device 210, e.g., when leaving proximity of the primary wireless device 210, the secondary wireless device 220, at 512, activates a cellular wireless interface of the secondary wireless device 220. Activation can include powering up all or a portion of cellular wireless circuitry to provide for establishing and/or receiving cellular wireless connections by the secondary wireless device 220. Subsequently, at 514, the secondary wireless device 220 performs a registration procedure to register the secondary wireless device 220 for cellular services, e.g., to originate and/or terminate directly at the secondary wireless device 220 cellular wireless connections. In some embodiments, the secondary wireless device 220 registers with an IMS server for cellular services. Upon successful registration for cellular services, e.g., with the IMS server, at 516, the secondary wireless device 220 can establish and/or receive cellular wireless connections directly at the secondary wireless device 220.

Figure 6:
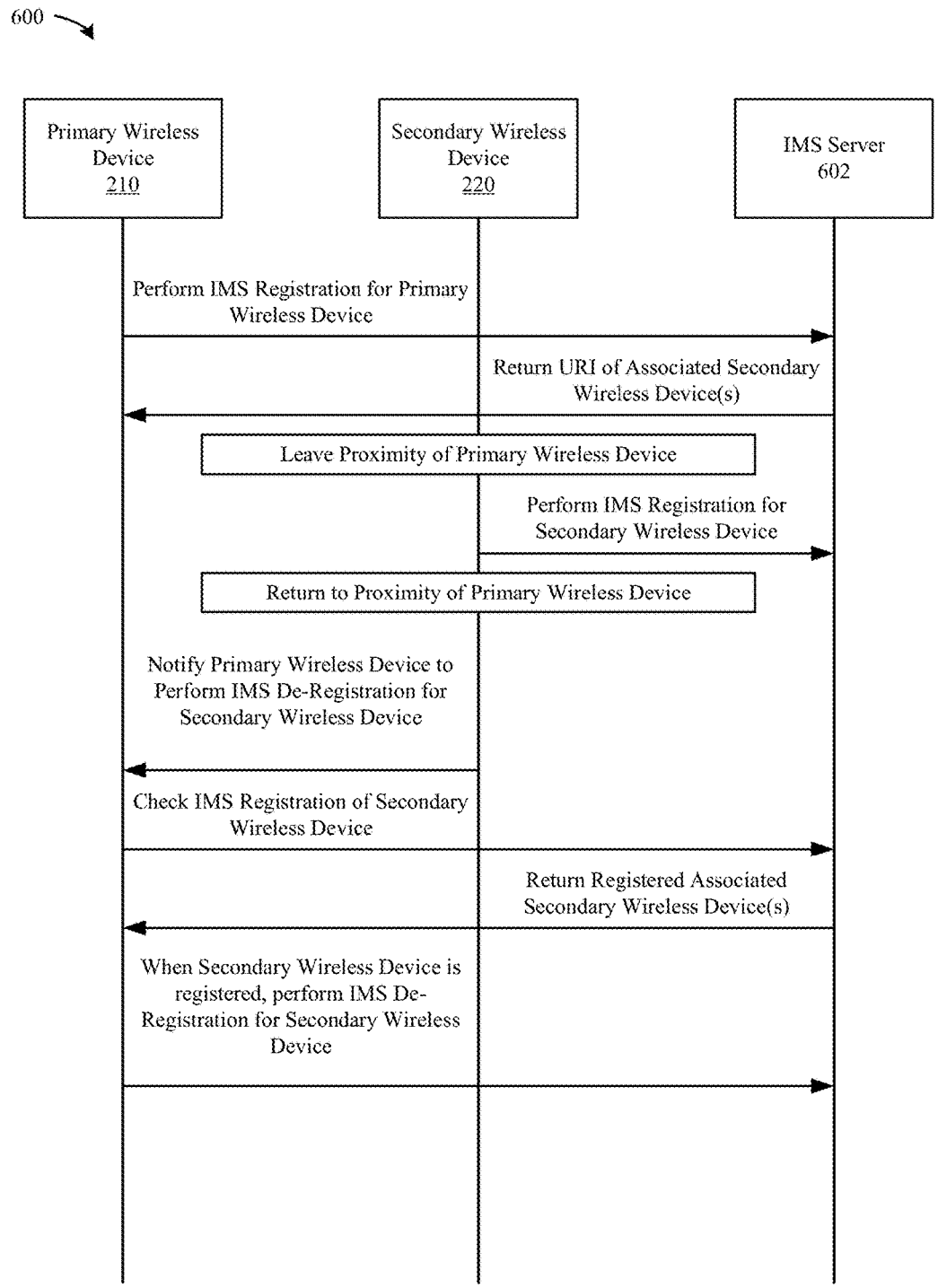
FIG. 6 illustrates a flowchart of another exemplary method performed by a wireless connection manager for managing registration and deregistration of a secondary wireless device for cellular services according to various embodiments of the present disclosure.

FIG. 6 illustrates a flowchart 600 of another exemplary method performed by a wireless connection manager for managing registration and deregistration of a secondary wireless device 220 for cellular services. A primary wireless device 210 can perform a registration procedure for cellular services for the primary wireless device 210, e.g., by communicating with an IMS server 602 associated with a wireless network. In response, and/or as part of the registration, the IMS server 602 can provide to the primary wireless device 210 information to identify a set of associated secondary wireless devices 220, e.g., return URIs of secondary wireless devices 220 associated with the primary wireless device 210. When a secondary wireless device 220 leaves proximity of the primary wireless device 210, the secondary wireless device 220 can perform a registration procedure to register the secondary wireless device 220 for cellular services, e.g., by communicating with an IMS server 602 associated with a wireless network. When registered for cellular services, the secondary wireless device 220 can receive and/or originate cellular connections directly from/ to the secondary wireless device 220. When the secondary wireless device 220 enters proximity of the primary wireless device 210, the secondary wireless device can notify the primary wireless device 210 to cause the primary wireless device 210 to perform a deregistration for cellular services for the secondary wireless device 220. The secondary wireless device 220 can activate all or a portion of cellular wireless circuitry of the secondary wireless device 220 in order to communicate with the IMS server 602 to register for cellular services and/or to receive/originate cellular connections when not in proximity to the primary wireless device 210. The secondary wireless device 220 can also deactivate all or a portion of cellular wireless circuitry of the secondary wireless device 220 when in proximity to the primary wireless device 210 to conserve battery power. The primary wireless device 210 can check with a network-based server, e.g., the IMS server 602, to determine whether the secondary wireless device 220 is registered for cellular services, e.g., by sending one or more messages formatted accordingly. In response, the network-based server, e.g., the IMS server 602, can provide information by which to identify secondary wireless devices 220 that are associated with the primary wireless device 210 and registered for cellular services. When the secondary wireless device 220 is registered for cellular services, the primary wireless device 210 can perform a deregistration procedure, e.g., by communicating with the network-based server, to deregister the secondary wireless device 220 for cellular services.

Figure 7A:
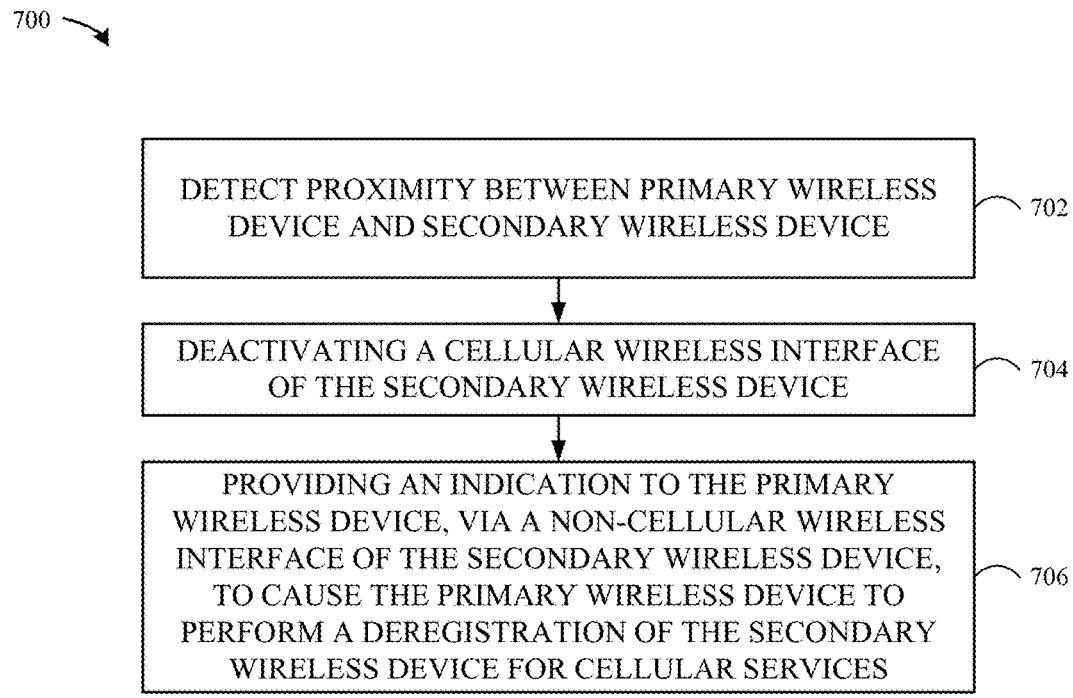
FIG. 7A illustrates a flowchart of an additional exemplary method performed by a wireless connection manager for managing registration and deregistration of a secondary wireless device for cellular services according to various embodiments of the present disclosure.

FIG. 7A illustrates a flowchart 700 of an additional exemplary method performed by a wireless connection manager for managing registration and deregistration of a secondary wireless device 220 for cellular services. At 702, the secondary wireless device 220 detects proximity of the secondary wireless device 220 to a primary wireless device 210 with which the secondary wireless device 220 has been previously associated. In response to the detecting, at 704, the secondary wireless device 220 deactivates a cellular wireless interface of the secondary wireless device 220. At 706, further in response to the detecting, the secondary wireless device 220 provides an indication to the primary wireless device 210, via a non-cellular wireless interface of the secondary wireless device 220, to cause the primary wireless device 210 to perform a deregistration procedure to deregister the secondary wireless device 220 for cellular services. In some embodiments, the secondary wireless device 220 detects proximity to the primary wireless device 210 by at least performing a discovery procedure in accordance with a WPAN protocol. In some embodiments, the secondary wireless device 220 detects proximity to the primary wireless device 210 by at least establishing communication with the primary wireless device 210 via the non-cellular wireless interface. In some embodiments, the non-cellular wireless interface of the secondary wireless device includes a WPAN interface and/or a WLAN interface. In some embodiments, the secondary wireless device 220 detects proximity to the primary wireless device 210 by at least detecting a signal strength for signals received from the primary wireless device 210 satisfies a signal strength threshold. In some embodiments, the secondary wireless device 220 is associated with the primary wireless device 210 for cellular services. In some embodiments, an association between the primary wireless device 210 and the secondary wireless device 220 for cellular services is maintained at a network-based server, which can be an IMS server and/or another cloud-service based server, such as an iCloud® server. In some embodiments, association between the primary wireless device 210 and the secondary wireless device 220 includes sharing a common telephone number for cellular services and/or sharing a common user account for cellular services. In some embodiments, registration of the secondary wireless device 220 for cellular services includes an IMS registration. In some embodiments, deactivating the cellular wireless interface of the secondary wireless device 220 includes powering down at least a portion of wireless circuitry of the secondary wireless device 220 used for cellular communications. In some embodiments, in response to a subsequent loss of proximity to the primary wireless device 210, the secondary wireless device 220 performs a registration procedure for cellular services for the secondary wireless device 220, e.g., in communication with a network-based server, such as an IMS server, using a cellular wireless interface of the secondary wireless device 220. In some embodiments, the secondary wireless device 220 detects the loss of proximity to the primary wireless device 210 by at least one or more of: (i) detecting loss of an established communication with the primary wireless device 210 or (ii) detecting a signal strength for signals received from the primary wireless device 210 that does not satisfy a signal strength threshold. In some embodiments, the secondary wireless device 220 provides a registration address of record of the secondary wireless device 220 to the primary wireless device 210 to use to perform a deregistration procedure for cellular services for the secondary wireless device 220.

Figure 7B:
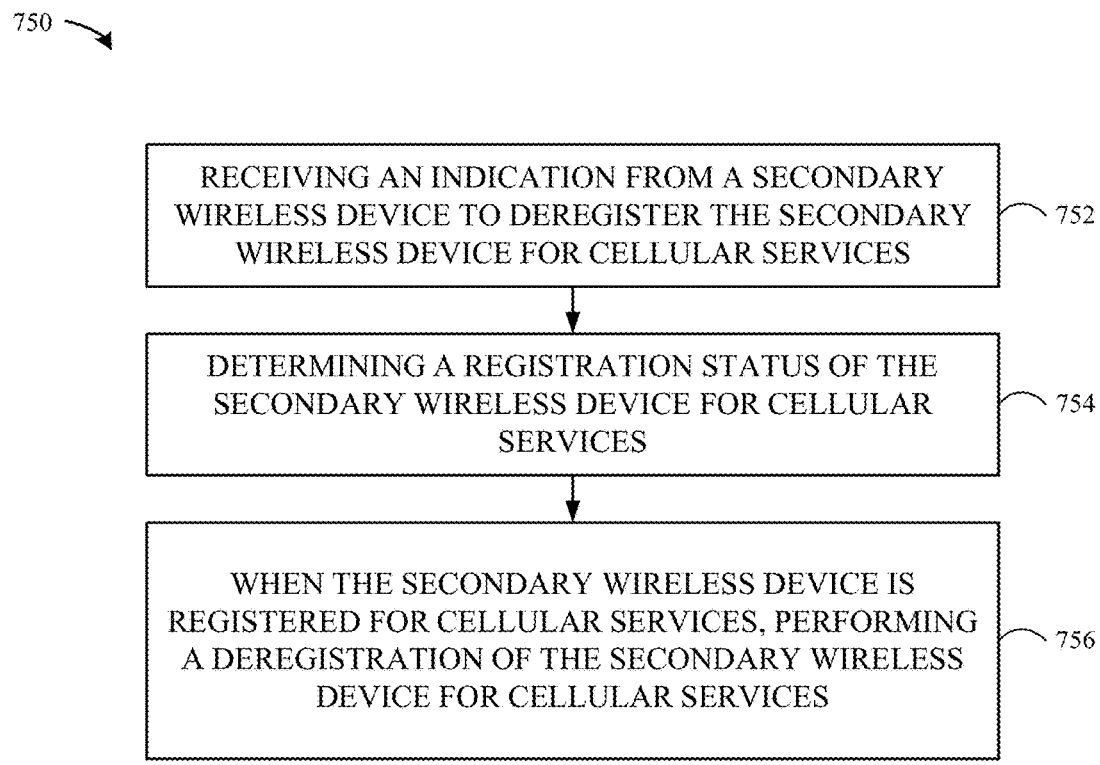
FIG. 7B illustrates a flowchart of a further exemplary method performed by a wireless connection manager for managing registration and deregistration of a secondary wireless device for cellular services according to various embodiments of the present disclosure.

FIG. 7B illustrates a flowchart 750 of a further exemplary method performed by a wireless connection manager for managing registration and deregistration of a secondary wireless device 220 for cellular services. At 752, a primary wireless device 210 receives an indication from the secondary wireless device 220 to deregister the secondary wireless device for cellular services. The indication from the secondary wireless device 220 can be received after detecting proximity of the secondary wireless device 220 to the primary wireless device 210. The primary wireless device 210, at 754, in response to receipt of the indication from the secondary wireless device 220, can determine a registration status of the secondary wireless device 220 for cellular services. When the secondary wireless device 220 is registered for cellular services, at 756, the primary wireless device 210 can perform a deregistration procedure to deregister the secondary wireless device 220 for cellular services. In some embodiments, the primary wireless device 210 determines the registration status of the secondary wireless device 220 for cellular services by at least sending a registration request to a network-based server, the registration request including a registered address of record for the secondary wireless device 220 and confirming whether the secondary wireless device 220 is registered for cellular services based on information received in response to the registration request. In some embodiments, the registration request sent by the primary wireless device 210 includes the register address of record of the secondary wireless device 220 in a To field and does not include a Contact header. In some embodiments, the response to the registration request includes a 200 OK response. In some embodiments, the primary wireless device 210 confirms that the secondary wireless device 220 is registered for cellular services based on whether a Contact header of the 200 OK response includes an associated Uniform Resource Identifier (URI) of the secondary wireless device 220. In some embodiments, the primary wireless device 210 obtains a set of URIs for associated secondary wireless devices 220 upon registration of the primary wireless device 210 for cellular services. In some embodiments, the primary wireless device 210 obtains the set of URIs by querying a network-based server, which can include an IMS server or a cloud-based server, such as a server associated with an iCloud service. In some embodiments, the primary wireless device 210 performs the deregistration procedure for the secondary wireless device 220 by at least sending a deregistration message to an IMS server, the deregistration message including an indication to remove all bindings associated with the secondary wireless device 220. In some embodiments, the deregistration message includes a From field with a registered address of record of the primary wireless device 210 and a To field with a registered address of record of the secondary wireless device 220. In some embodiments, the indication to deregister the secondary wireless device 220 received by the primary wireless device 210 from the secondary wireless device 220 includes the registered address of record of the secondary wireless device 220. In some embodiments, primary wireless device 210 detects proximity of the secondary wireless device 220 before receiving the indication to deregister the secondary wireless device 220 for cellular services. In some embodiments, the primary wireless device 210 detects proximity of the secondary wireless device 220 by at least performing a discovery procedure in accordance with a WPAN protocol. In some embodiments, the primary wireless device 210 detects proximity of the secondary wireless device 220 by at least establishing communication with the secondary wireless device 220 via a non-cellular wireless interface. In some embodiments, the primary wireless device 210 obtains a set of addresses of record for secondary wireless devices 220 associated with the primary wireless device 210 from an IMS server. In some embodiments, the primary wireless device 210 obtains a set of addresses of record for secondary wireless devices 220 associated with the primary wireless device 210 from a cloud-based server. In some embodiments, the primary wireless device 210 performs the deregistration procedure to deregister the secondary wireless device 220 for cellular services by at least sending a short message service (SMS) message to a known server address.

Representative Exemplary Apparatus

Figure 8:
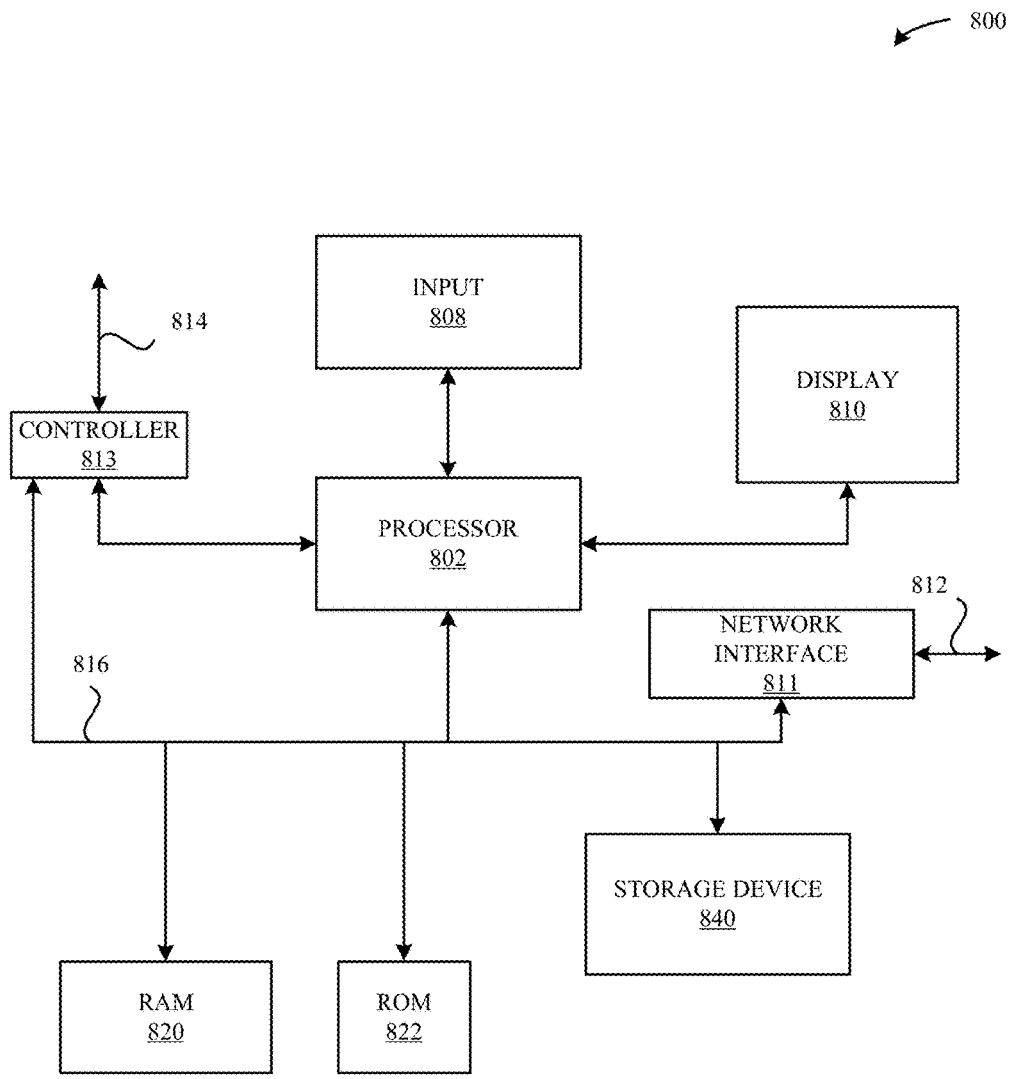
FIG. 8 illustrates in block diagram format an exemplary computing device that can be used to implement the various components and techniques described herein according to various embodiments of the present disclosure.

FIG. 8 illustrates in block diagram format an exemplary computing device 800 that can be used to implement the various components and techniques described herein, according to some embodiments. In particular, the detailed view of the exemplary computing device 800 illustrates various components that can be included in the wireless device 102 illustrated in FIG. 1. As shown in FIG. 8, the computing device 800 can include a processor 802 that represents a microprocessor or controller for controlling the overall operation of computing device 800. The computing device 800 can also include a user input device 808 that allows a user of the computing device 800 to interact with the computing device 800. For example, the user input device 808 can take a variety of forms, such as a button, keypad, dial, touch screen, audio input interface, visual/image capture input interface, input in the form of sensor data, etc. Still further, the computing device 800 can include a display 810 (screen display) that can be controlled by the processor 802 to display information to the user (for example, information relating to incoming, outgoing, or active communication session). A data bus 816 can facilitate data transfer between at least a storage device 840, the processor 802, and a controller 813. The controller 813 can be used to interface with and control different equipment through an equipment control bus 814. The computing device 800 can also include a network/bus interface 811 that couples to a data link 812. In the case of a wireless connection, the network/bus interface 811 can include wireless circuitry, such as a wireless transceiver and/or baseband processor.

The computing device 800 also includes a storage device 840, which can comprise a single storage or a plurality of storages (e.g., hard drives), and includes a storage management module that manages one or more partitions within the storage device 840. In some embodiments, storage device 840 can include flash memory, semiconductor (solid state) memory or the like. The computing device 800 can also include a Random Access Memory ("RAM") 820 and a Read-Only Memory ("ROM") 822. The ROM 822 can store programs, utilities or processes to be executed in a non-volatile manner. The RAM 820 can provide volatile data storage, and stores instructions related to the operation of the computing device 800.

Figure 9:
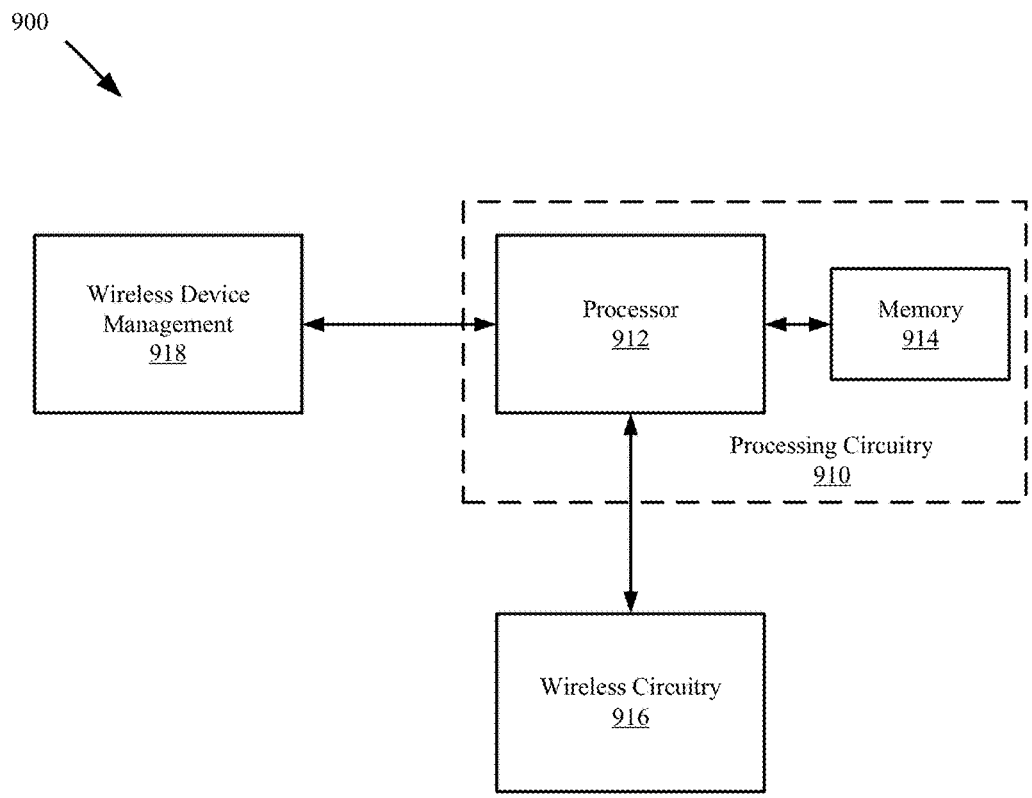
FIG. 9 illustrates in block diagram format an example representative set of elements of a wireless device that can be used to implement the various components and techniques described herein according to various embodiments of the present disclosure.

FIG. 9 illustrates a block diagram of an example apparatus 900 that can be implemented in a wireless device 102, e.g., a primary wireless device 210 and/or a secondary wireless device 220 and/or to realize, at least in part, registration for cellular services for a secondary wireless device 220 associated with a primary wireless device 210, in accordance with some embodiments. It will be appreciated that the components, devices or elements illustrated in and described with respect to FIG. 9 may not be mandatory and thus some may be omitted in certain embodiments. Additionally, some embodiments can include further or different components, devices or elements beyond those illustrated in and described with respect to FIG. 9. Further, it will be appreciated that, in some embodiments, one or more components of the apparatus 900 can be distributed across a plurality of computing devices that can collectively provide the functionality for wireless connection management.

In some example embodiments, the apparatus 900 can include processing circuitry 910 that is configurable to perform actions in accordance with one or more example embodiments disclosed herein. In this regard, the processing circuitry 910 can be configured to perform and/or control performance of one or more functionalities of the apparatus 900 in accordance with various embodiments, and thus can provide means for performing functionalities of the apparatus 900 in accordance with various embodiments. The processing circuitry 910 can be configured to perform data processing, application execution and/or other processing and management services according to one or more embodiments.

In some embodiments, the apparatus 900 or a portion(s) or component(s) thereof, such as the processing circuitry 910, can include one or more chipsets, each of which can include one or more chips. The processing circuitry 910 and/or one or more further components of the apparatus 900 can therefore, in some instances, be configured to implement an embodiment on a chipset comprising one or more chips. In some example embodiments in which one or more components of the apparatus 900 are embodied as a chipset, the chipset can be capable of enabling a computing device(s) to operate wireless device in accordance with embodiments as disclosed herein.

In some example embodiments, the processing circuitry 910 can include a processor 912 and, in some embodiments, such as that illustrated in FIG. 9, can further include memory 914 (or another non-transitory storage medium). The processing circuitry 910 can be in communication with or otherwise control wireless circuitry 916 and/or a wireless device management module 918.

The processor 912 can be embodied in a variety of forms. For example, the processor 912 can be embodied as various processing hardware-based means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 912 can include a plurality of processors. The plurality of processors can be in operative communication with each other and can be collectively configured to perform one or more functionalities of the apparatus 900 as described herein. In embodiments including a plurality of processors, the plurality of processors can be implemented on a single computing device, or can be distributed across a plurality of computing devices that can collectively provide functionality of a wireless device, such as the primary wireless device 210 and/or the secondary wireless device 220. In some example embodiments, the processor 912 can be configured to execute instructions that can be stored in the memory 914 or that can be otherwise accessible to the processor 912. As such, whether configured by hardware or by a combination of hardware and software, the processor 912 can be capable of performing operations according to various embodiments while configured accordingly.

In some embodiments, the memory 914 can include one or more memory devices. The memory 914 can include fixed and/or removable memory devices. In some embodiments, the memory 914 can provide a non-transitory computer-readable storage medium that can store computer program instructions that can be executed by the processor 912. In this regard, the memory 914 can be configured to store information, data, applications, instructions and/or the like for enabling the apparatus 900 to carry out various functions in accordance with one or more embodiments. In embodiments including a plurality of memory devices, the plurality of memory devices can be implemented on a single computing device, or can be distributed across a plurality of computing devices that can collectively provide functionality of a wireless device. In some embodiments, the memory 914 can be in communication with one or more of the processor 912, wireless circuitry 916, or wireless device management module 918 via one or more busses for passing information among components of the apparatus 900.

The apparatus 900 can further include wireless circuitry 916. The wireless circuitry 916 can include one or more interface mechanisms for enabling communication with other devices and/or networks. For example, the wireless circuitry 916 can be configured to enable the apparatus 900 to communicate over one or more networks, such as the WWAN 108, the WLAN 106, and/or the WPAN 104. The apparatus 900 can include multiple sets of wireless circuitry 916, which can each provide communication in accordance with a wireless communication protocol. In various embodiments, the wireless circuitry 916 can include, for example, an antenna (or multiple antennas) and supporting hardware and/or software for enabling communications with one or more wireless communication networks, such as a cellular network. In some embodiments, the wireless circuitry 916 can be referred to as a communication interface(s) and include a combination of requisite hardware, software, or firmware to provide wireless communications in accordance with one or more wireless communication protocols, such as a Wi-Fi protocol, an IEEE 802.11 wireless communication protocol, a cellular wireless communication protocol, a WLAN protocol, a WPAN protocol, e.g., such as Bluetooth or Apple Wireless Direct Link (AWDL).

The apparatus 900 can further include a wireless device management module 918. The wireless device management module 918 can be embodied as various means, such as circuitry, hardware, a computer program product comprising computer readable program instructions stored on a non-transitory computer readable medium (for example, the memory 914) and executed by a processing device (for example, the processor 912), or some combination thereof. In some embodiments, the processor 912 (or the processing circuitry 910) can include, or otherwise control the wireless device management module 918. The wireless device management module 918 can be configured to support management of registration of a secondary wireless device 220 associated with a primary wireless device 210 in support of one or more example embodiments.

Representative Embodiments

In some embodiments, a method for managing registration for cellular services of a secondary wireless device includes the secondary wireless device: detecting proximity of the secondary wireless device to a primary wireless device with which the secondary wireless device has been previously associated; and in response to the detecting: deactivating a cellular wireless interface of the secondary wireless device; and providing an indication to the primary wireless device, via a non-cellular wireless interface of the secondary wireless device, to cause the primary wireless device to perform a deregistration of the secondary wireless device for cellular services.

In some embodiments, detecting proximity of the secondary wireless device to the primary wireless device includes performing a discovery procedure in accordance with a wireless personal area network protocol. In some embodiments, detecting proximity of the secondary wireless device to the primary wireless device includes establishing communication with the primary wireless device via the non-cellular wireless interface. In some embodiments, the non-cellular wireless interface of the secondary wireless device includes a wireless personal area network (WPAN) interface or a wireless local area network (WLAN) interface. In some embodiments, detecting proximity of the secondary wireless device to the primary wireless device includes detecting a signal strength for signals received from the primary wireless device satisfies a signal strength threshold. In some embodiments, the secondary wireless device is associated with the primary wireless device for cellular services. In some embodiments, association of the secondary wireless device with the primary wireless device includes sharing a common telephone number for cellular services. In some embodiments, registration for cellular services of the secondary wireless device includes an Internet Protocol Multimedia Services (IMS) registration. In some embodiments, deactivating the cellular wireless interface of the secondary wireless device includes powering down at least a portion of wireless circuitry of the secondary wireless device used for cellular communications. In some embodiments, the method performed by the secondary wireless device further includes, in response to detecting loss of proximity of the secondary wireless device to the primary wireless device, performing a registration of the secondary wireless device for cellular services. In some embodiments, detecting the loss of proximity of the secondary wireless device to the primary wireless device includes detecting loss of an established communication with the primary wireless device. In some embodiments, detecting the loss of proximity of the secondary wireless device to the primary wireless device includes detecting a signal strength for signals received from the primary wireless device does not satisfy a signal strength threshold. In some embodiments, the indication to the primary wireless device includes a registration address of record of the secondary wireless device to perform the deregistration of the secondary wireless device for cellular services.

In some embodiments, a method for managing registration for cellular services of a secondary wireless device includes a primary wireless device: receiving an indication from the secondary wireless device to deregister the secondary wireless device for cellular services; and in response to receipt of the indication: determining a registration status of the secondary wireless device for cellular services; and when the secondary wireless device is registered for cellular services, performing a deregistration of the secondary wireless device for cellular services. In some embodiments, determining the registration status of the secondary wireless device for cellular services includes: sending a registration request to a network-based server, the registration request including a registered address of record for the secondary wireless device; and confirming whether the secondary wireless device is registered for cellular services based on information received in response to the registration request from the network-based server. In some embodiments, the registration request includes the registered address of record in a To field and does not include a Contact header. In some embodiments, the response to the registration request includes a 200 OK response; and the primary wireless device confirms the secondary wireless device is registered for cellular services based on whether a Contact header of the 200 OK response includes an associated Uniform Resource Identifier (URI) of the secondary wireless device. In some embodiments, the method further includes the primary wireless device obtaining a set of Uniform Resource Identifiers (URIs) for associated secondary wireless devices upon registration of the primary wireless device for cellular services. In some embodiments, performing the deregistration of the secondary wireless device includes sending a deregistration message to an Internet Protocol Multimedia Service (IMS) server including an indication to remove all bindings associated with the secondary wireless device. In some embodiments, the deregistration message includes a From field including a registered address of record of the primary wireless device and a To field including a registered address of record of the secondary wireless device. In some embodiments, the indication received from the secondary wireless device to deregister the secondary wireless device for cellular services includes a registered address of record of the secondary wireless device. In some embodiments, the method further includes the primary wireless device detecting proximity of the secondary wireless device to the primary wireless device before receiving the indication to deregister the secondary wireless device for cellular services. In some embodiments, detecting proximity of the secondary wireless device to the primary wireless device includes performing a discovery procedure in accordance with a wireless personal area network protocol. In some embodiments, detecting proximity of the secondary wireless device to the primary wireless device comprises establishing communication with the secondary wireless device via a non-cellular wireless interface. In some embodiments, the method performed by the primary wireless device further includes obtaining a set of Uniform Resource Identifiers (URIs) for associated secondary wireless devices upon registration of the primary wireless device for cellular services. In some embodiments, performing the deregistration of the secondary wireless device includes sending a deregistration message to an Internet Protocol Multimedia Service (IMS) server including an indication to remove all bindings associated with the secondary wireless device. In some embodiments, the deregistration message includes a From field that includes a registered address of record of the primary wireless device and a To field that includes a registered address of record of the secondary wireless device. In some embodiments, the indication received from the secondary wireless device to deregister the secondary wireless device for cellular services includes a registered address of record of the secondary wireless device. In some embodiments, the method further includes the primary wireless device detecting proximity of the secondary wireless device to the primary wireless device before receiving the indication to deregister the secondary wireless device for cellular services. In some embodiments, detecting proximity of the secondary wireless device to the primary wireless device includes performing a discovery procedure in accordance with a wireless personal area network protocol. In some embodiments, detecting proximity of the secondary wireless device to the primary wireless device includes establishing communication with the secondary wireless device via a non-cellular wireless interface. In some embodiments, the method further includes the primary wireless device obtaining a set of addresses of record for secondary wireless devices associated with the primary wireless device from an Internet Protocol Multimedia Service (IMS) server. In some embodiments, the method further includes the primary wireless device obtaining a set of addresses of record for secondary wireless devices associated with the primary wireless device from a cloud-based server. In some embodiments, performing the deregistration of the secondary wireless device for cellular services comprises the primary wireless device sending a short message service (SMS) message to a known server address to deregister the secondary wireless device for cellular services.

The various aspects, embodiments, implementations or features of the described embodiments can be used separately or in any combination. Various aspects of the described embodiments can be implemented by software, by hardware, or by a combination of hardware and software. The described embodiments can also be embodied as computer readable code on a computer readable medium. The computer readable medium is any data storage device that can store data, which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing registration for cellular services of a secondary wireless device, the method comprising:
by the secondary wireless device:
detecting proximity of the secondary wireless device to a primary wireless device with which the secondary wireless device has been previously associated for cellular services; and
in response to the detecting:
deactivating a cellular wireless interface of the secondary wireless device; and
subsequent to the deactivating, providing an indication to the primary wireless device, via a non-cellular wireless interface of the secondary wireless device, to cause the primary wireless device to perform a deregistration of the secondary wireless device for cellular services,
wherein:
the indication includes a registration address of record for the secondary wireless device that the primary wireless device uses for the deregistration, and
the secondary wireless device can establish connections and communicate via the non-cellular wireless interface while within proximity of the primary wireless device.

2. The method of claim 1, wherein the detecting proximity of the secondary wireless device to the primary wireless device comprises performing a discovery procedure in accordance with a wireless personal area network protocol.

3. The method of claim 1, wherein the detecting proximity of the secondary wireless device to the primary wireless device comprises establishing communication with the primary wireless device via the non-cellular wireless interface.

4. The method of claim 1, wherein the detecting proximity of the secondary wireless device to the primary wireless device comprises:
detecting a signal strength for signals received from the primary wireless device satisfies a signal strength threshold.

5. The method of claim 1, wherein the secondary wireless device is associated with the primary wireless device for cellular services including sharing a common telephone number for cellular services.

6. The method of claim 1, wherein registration for cellular services of the secondary wireless device comprises an Internet Protocol Multimedia Services (IMS) registration.

7. The method of claim 1, wherein the deactivating the cellular wireless interface of the secondary wireless device comprises powering down at least a portion of wireless circuitry of the secondary wireless device used for cellular communications.

8. The method of claim 1, further comprising:
by the secondary wireless device:
in response to detecting loss of proximity of the secondary wireless device to the primary wireless device, performing a registration of the secondary wireless device for cellular services.

9. The method of claim 8, wherein the detecting the loss of proximity of the secondary wireless device to the primary wireless device comprises detecting loss of an established communication with the primary wireless device.

10. The method of claim 8, wherein the detecting the loss of proximity of the secondary wireless device to the primary wireless device comprises detecting a signal strength for signals received from the primary wireless device does not satisfy a signal strength threshold.

11. An apparatus configurable for operation in a secondary wireless device, the apparatus comprising:
processing circuitry including a processor communicatively coupled to a memory storing instructions that, when executed by the processor, cause the secondary wireless device to:
detect proximity of the secondary wireless device to a primary wireless device with which the secondary wireless device has been previously associated for cellular services; and
in response to detecting:
deactivate a cellular wireless interface of the secondary wireless device; and
subsequent to the deactivating, provide an indication to the primary wireless device, via a non-cellular wireless interface of the secondary wireless device, to cause the primary wireless device to perform a deregistration of the secondary wireless device for cellular services,
wherein:
the indication includes a registration address of record for the secondary wireless device that the primary wireless device uses for the deregistration, and
the secondary wireless device can establish connections and communicate via the non-cellular wireless interface while within proximity of the primary wireless device.

12. The apparatus of claim 11, wherein the secondary wireless device detects proximity of the secondary wireless device to the primary wireless device by performing a discovery procedure in accordance with a wireless personal area network protocol.

13. The apparatus of claim 11, wherein the secondary wireless device detects proximity of the secondary wireless device to the primary wireless device by establishing communication with the primary wireless device via the non-cellular wireless interface.

14. The apparatus of claim 11, wherein the secondary wireless device is associated with the primary wireless device for cellular services including sharing a common telephone number for cellular services.

15. The apparatus of claim 11, wherein registration for cellular services of the secondary wireless device comprises an Internet Protocol Multimedia Services (IMS) registration.

16. The apparatus of claim 11, wherein the secondary wireless device deactivates the cellular wireless interface of the secondary wireless device by powering down at least a portion of wireless circuitry of the secondary wireless device used for cellular communications.

17. The apparatus of claim 11, wherein execution of the instructions further causes the secondary wireless device to:

in response to detecting loss of proximity of the secondary wireless device to the primary wireless device, perform a registration of the secondary wireless device for cellular services.

18. A secondary wireless device comprising:

one or more antennas;

a cellular wireless interface communicatively coupled to the one or more antennas;

a non-cellular wireless interface communicatively coupled to the one or more antennas; and processing circuitry including a processor communicatively coupled to a memory storing instructions that, when executed by the processor, cause the secondary wireless device to:

detect proximity of the secondary wireless device to a primary wireless device with which the secondary wireless device has been previously associated for cellular services; and in response to detecting:

deactivate the cellular wireless interface of the secondary wireless device; and subsequent to the deactivating, provide an indication to the primary wireless device, via the non-cellular wireless interface of the secondary wireless device, to cause the primary wireless device to perform a deregistration of the secondary wireless device for cellular services, wherein:

the indication includes a registration address of record for the secondary wireless device that the primary wireless device uses for the deregistration, and the secondary wireless device can establish connections and communicate via the non-cellular wireless interface while within proximity of the primary wireless device.

19. The secondary wireless device of claim 18, wherein the secondary wireless device deactivates the cellular wireless interface of the secondary wireless device by powering down at least a portion of wireless circuitry of the secondary wireless device used for cellular communications.

20. The secondary wireless device of claim 18, wherein execution of the instructions further causes the secondary wireless device to:

in response to detecting loss of proximity of the secondary wireless device to the primary wireless device, perform a registration of the secondary wireless device for cellular services.

\* \* \* \* \*